United States Patent Office 3,753,920
Patented Aug. 21, 1973

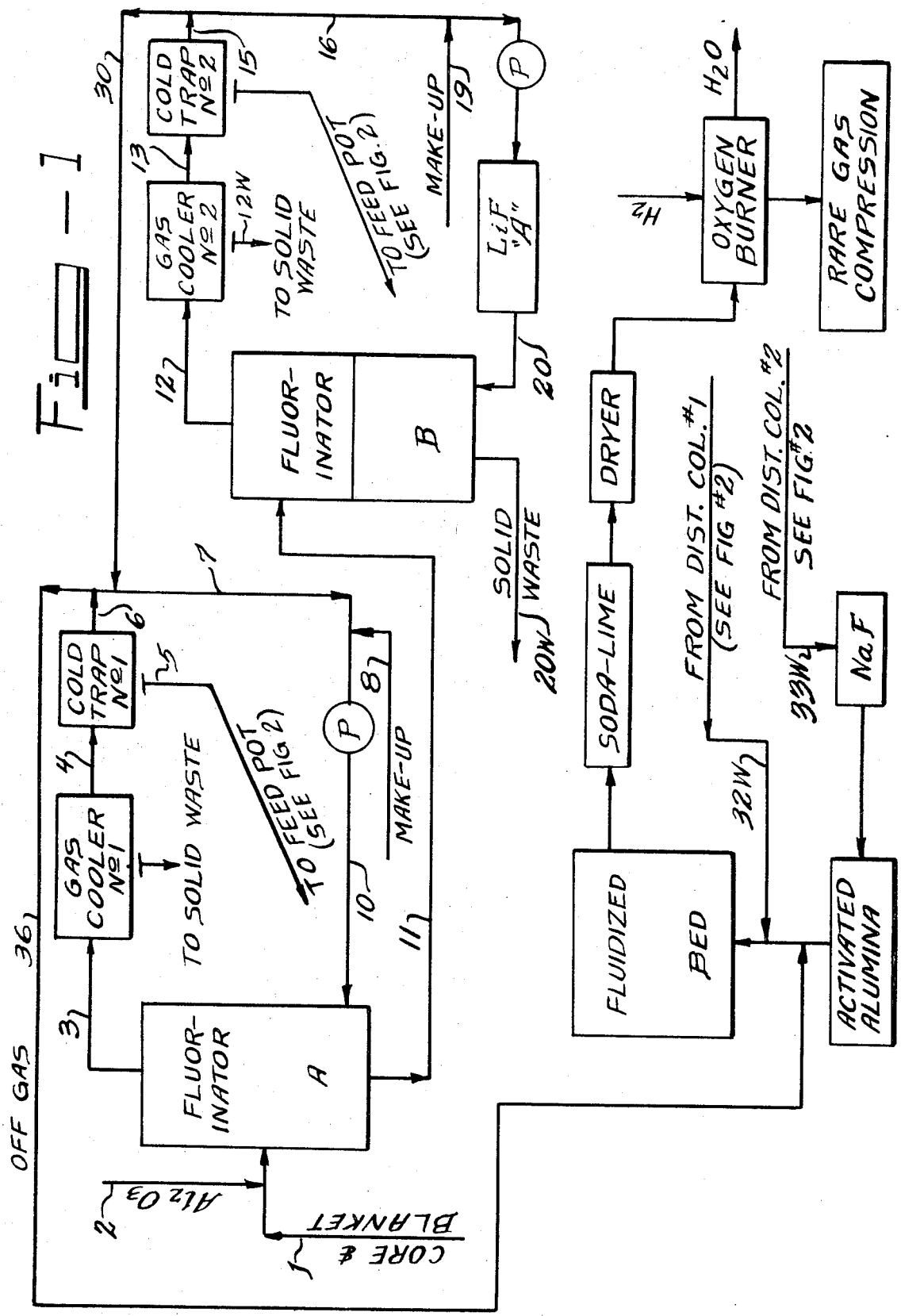

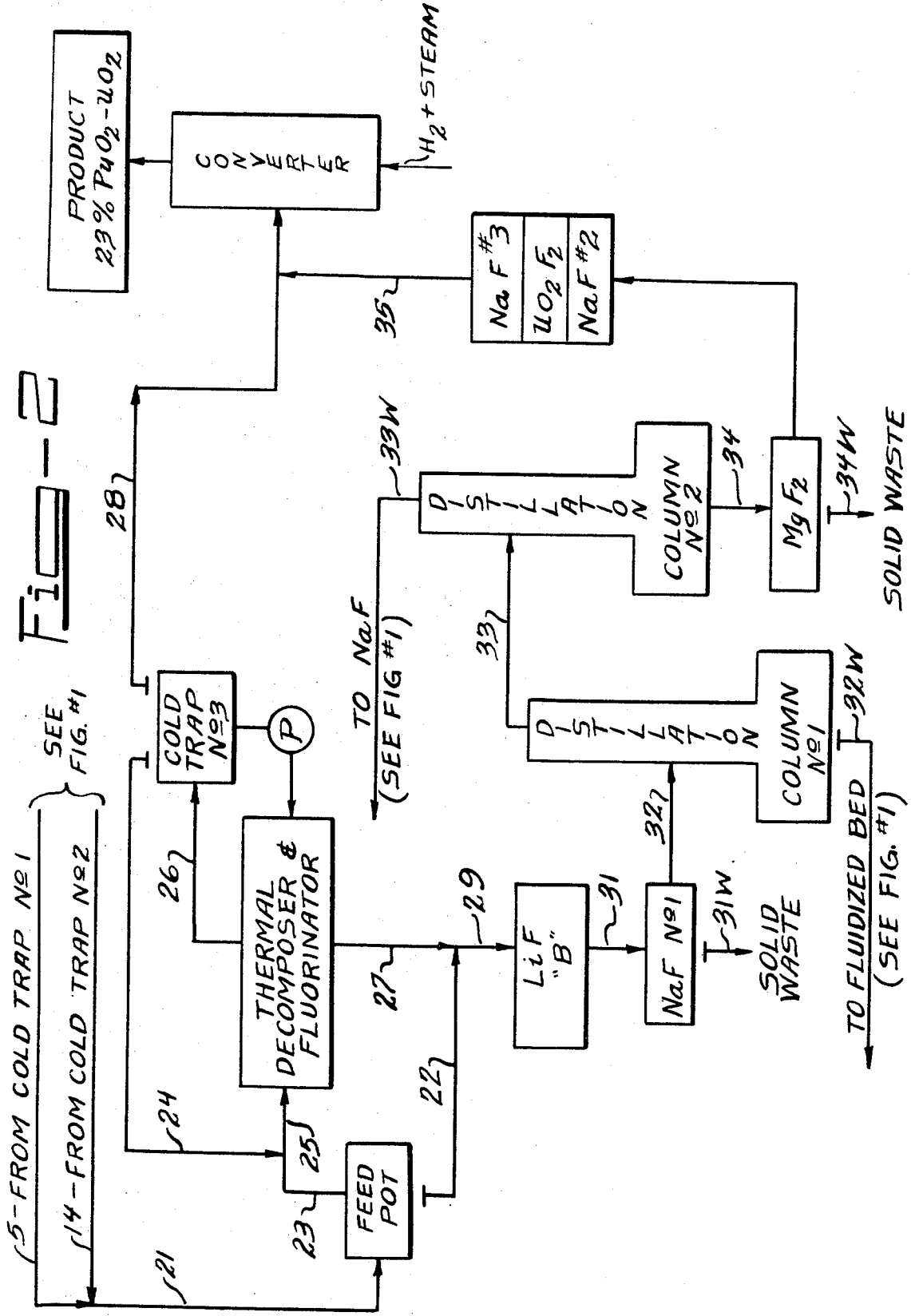

3,753,920
FLUORIDE REPROCESSING OF BREEDER FUELS
Louis J. Anastasia, Midlothian, Erwin L. Carls, Glen Ellyn, Albert A. Chilenskas, Chicago, Johan E. A. Graae, and Albert A. Jonke, Elmhurst, Norman M. Levitz, Bellwood, Martin J. Steindler, Park Forest, and La Verne E. Trevorrow, Glen Ellyn, Ill., assignors to the United States of America as represented by the United States Atomic Energy Commission
Continuation of abandoned application Ser. No. 770,145, Oct. 24, 1968. This application Aug. 12, 1971, Ser. No. 171,315
Int. Cl. C01g 43/06
U.S. Cl. 252—301.1 R          2 Claims

ABSTRACT OF THE DISCLOSURE

Spent fuel oxides are fluorinated to produce a plutonium-rich stream and a uranium-rich stream. Each stream is cold trapped to remove high boiling fission products and fed to a thermal decomposer, via a common feed pot which acts as a batch distiller. From the thermal decomposer, a plutonium-rich stream is cold trapped and sent to a converter and a uranium-rich stream is purified by means of various traps and distillation columns and sent to the converter. In the converter, the uranium-rich stream and plutonium-rich stream are combined and converted to mixed oxides.

This is a continuation of application S.N. 770,145, now abandoned, filed Oct. 24, 1968.

CONTRACTUAL ORIGIN OF THE INVENTION

The invention described herein was made in the course of, or under, a contract with the United States Atomic Energy Commission.

BACKGROUND OF THE INVENTION

This invention relates to a process for reprocessing nuclear fuels and in particular to a nonaqueous process for reprocessing fast breeder fuels. The next generation of nuclear reactors will be breeder reactors that will generate large quantities of plutonium while at the same time producing power. It is necessary to reprocess spent breeder fuel to separate the uranium and plutonium from fission products produced during irradiation. New processes are necessary for handling the new breeder fuels.

A fluoride volatility process has been developed at Argonne National Laboratory for continuously reprocessing spent breeder fuels. The object of this invention is to reprocess spent oxide fuel to produce either plutonium dioxide and uranium dioxide separately or a mixed product of 23% plutonium dioxide-uranium dioxide with a fission product decontamination factor of $10^6$ to $10^7$. The decontamination factor is the ratio of the concentration of fission products in the spent fuel to the concentration of fission products in the product. The subject process is based on a plant capacity of about one metric ton actinides per day, which is taken as the daily average discharge rate from a 15,000 megawatt electric network. Exact equipment size and shape are influenced by heat balance and criticality considerations which vary according to the type of fuel and the extent of burnup. The process may be better understood by reference to the following figures.

BRIEF DESCRIPTION OF THE DRAWINGS

FIGS. 1 and 2 represent a flowsheet of the process of the invention.

DESCRIPTION OF THE PREFERRED EMBODIMENT

With reference to the figures which represent a typical flowsheet except for the broken lines at the gas coolers and cold traps which represent batch operations, each piece of equipment is labelled and numbered where there are more than one of that particular type. Table I lists the number, size or capacity, construction material and operating temperature for each piece of equipment. The reference numbers corresponding to each stream leaving or entering each piece of equipment are keyed to Table II, which shows the actinide and fission product distribution for the process as well as the gas flow rate of each stream.

TABLE I

| Equipment item | Number required | Size or capacity | Construction material | Operating temp., °C. |
|---|---|---|---|---|
| Fluorinator A | 1 | Slab, 4″ x 48″ x 10′ | Nickel | 350 |
| Gas cooler, 1 | 2 | Slab, 4″ x 24″ x 9′ | do | 15 |
| Cold trap, 1 | 2 | Slab, 4″ x 24″ x 17′ | do | −80 |
| Recycle pump | 2 | 40 s.c.f.m. | Nickel or Monel | >70 |
| 3W, solid waste container | | 2′ diameter x 9′ | Stainless steel | |
| Fluorinator B | 1 | Slab, 4″ x 30″ x 10′ | Nickel | 500–550 |
| Gas cooler, 2 | 2 | Slab, 4″ x 24″ x 5′ | do | −10 |
| Cold trap, 2 | 2 | Slab, 4′ x 24″ x 3½′ | do | −80 |
| Recycle pump | 2 | 30 s.c.f.m. | Nickel or Monel | >70 |
| LiF traps, A & B | 2 | 10″ diameter x 3¼′ | Nickel | 300, 450 |
| 20W, Solid waste container | 1 | 2′ diameter x 9 | Stainless steel | |
| 12W, solid waste container | 1 | 2′ diameter x 9 | do | |
| Feed pot | 2 | Slab, 4″ x 4′ x 11.2′ | Nickel | 80 |
| Thermal decomposer and fluorinator | 2 | Slab, 4″ x 31″ x 10′ | do | 350–500 |
| NaF, 1, 2, 3 traps | 1 | 3″ diameter x 4′ | do | 350 |
| 31W, solid waste container | 1 | 2′ diameter x 9′ | Stainless steel | |
| Cold trap, 3 | 3 | 4″ x 24″ x 3′ | Nickel | −80 |
| Recycle pump | 2 | 20 s.c.f.m. | Nickel or Monel | >70 |
| Distillation column, 1 | 1 | Column, 4″ diameter x 11′ | Nickel | ~80 |
| Distillation column, 2 | 1 | Column, 5″ diameter x 29′ | do | ~80 |
| MgF₂ trap | 2 | 18″ diameter x 4′ | do | 125 |
| Activated alumina traps, 1 Fluid Bed (F₂ reaction) | 2 | 10″ diameter x 7½′ | do | |
| Activated alumina trap, packed, 1 (TeF₆ sorption) | 2 | 18″ diameter x 4¼′ | Copper | |
| Soda-lime trap | 2 | 10′ diameter x ~6′ | do | |
| Drier, molecular sieve | 2 | 10″ diameter x 6′ | do | |
| Oxygen-hydrogen burner | 1 | 12″ diameter x 6′ | Stainless steel | |
| Xe-Kr compressor | 2 | ~1 s.c.f.m. | do | |
| Xe-Kr storage tank | 1 | 3′ diameter x 12.5′ | do | |
| Converter | 1 | 2′ x 2′ x 10′ | Inconel | 650 |
| Sorber | 1 | 5′ diameter x 15′ | Monel | |

TABLE II.—GRAMS OF ELEMENT OR COMPOUND

| Stream | 1 | 3 | 3W | 4 | 5 | 6 | 36 | 7 | 10b |
|---|---|---|---|---|---|---|---|---|---|
| Flow rates (s.c.f.m.) | | 32.7 | | | | | 2.2 | | |
| PuF₆ | a 123 (+3) | 4,920 | 0 | 4,920 | 4,919.5 | 0.5 | .03 | .47 | .47 |
| UF₆ | 1,290 (+3) | 1,277 (+3) | 0 | 1,277 (+3) | 1,277 (+3) | 18 | 1 | 17 | 17 |
| NpF₆ | 242 | 121 | 0 | 121 | 121 | .04 | .003 | .037 | .037 |
| NbF₅ | 152 | 137 | 103 | 34 | 34 | c 8.0 (−13) | 7.8 (−13) | 1.0 (−11) | 1.0 (−11) |
| MoF₆ | 8,120 | 7,308 | 0 | 7,308 | 7,290 | 18 | 1 | 17 | 17 |
| TcF₆ | 1,990 | 1,791 | 0 | 1,791 | 1,791 | 0.46 | .03 | 0.43 | 0.43 |
| RuF₅ | 7,470 | 6,723 | 6,721 | 2 | 2 | 1.3 (−16) | 9.4 (−18) | 1.2 (−16) | 1.2 (−16) |
| SbF₅ | 248 | 223 | 0 | 223 | 223 | .094 | .007 | .087 | .087 |
| TeF₆ | 1,620 | | 0 | | 1,365 | | .93 | | |
| IF₅ | 882 | 794 | 0 | 794 | 794 | .025 | .002 | .023 | .023 |
| Kr | 133 | | 0 | | 0 | | 133 | | |
| Xe | 4,680 | | 0 | | 0 | | 4,680 | | |

| Stream | 11 | 12 | 12W | 13 | 14 | 15 | 16 | 20 | 20W |
|---|---|---|---|---|---|---|---|---|---|
| Flow rates (s.c.f.m.) | | 23.0 | | | | | | | |
| PuF₆ | 118.0 (+3) | 117.8 (+3) | 0 | 117.8 (+3) | 117.8 (+3) | 76 | 76 | 1.38 (+3) | 250 |
| UF₆ | 12.9 (+3) | 12.8 (+3) | 0 | 12.8 (+3) | 12.8 (+3) | 1 | 1 | 130 | 130 |
| NpF₆ | 121 | 119 | 0 | 119 | 118.7 | 0.3 | 0.3 | 0.32 | 2 |
| NbF₅ | 15 | 14 | 13.4 | 0.6 | 0.6 | 2.9 (−11) | 2.9 (−11) | 3.5 | 1 |
| MoF₆ | 829 | 827 | 0 | 827 | 813 | 14 | 14 | 14.8 | 16 |
| TcF₆ | 199 | 198 | 0 | 198 | 197.7 | 0.32 | 0.32 | 0.52 | 1 |
| RuF₅ | 747 | 745 | 744.97 | 0.03 | 0.03 | 3.9 (−11) | 3.9 (−11) | 0.2 | 2 |
| SbF₅ | 25 | 24 | 0 | 24 | 24 | 7.2 (−4) | 7.2 (−4) | 25 | 1 |
| TeF₆ | 162 | | 0 | | 159 | | | .15 | 3 |
| IF₅ | 88 | 86 | 0 | 86 | 86 | 1.8 (−3) | 1.8 (−3) | 0.8 | 2 |
| Kr | | | 0 | | 0 | | | | 0 |
| Xe | | | 0 | | 0 | | | | 0 |

| Stream | 21 | 22 | 23 | 24 | 25 | 26 | 27 | 28 | 29 |
|---|---|---|---|---|---|---|---|---|---|
| Flow rates (s.c.f.m.) | | | | | | 23.0 | 2.0 | | |
| PuF₆ | 122.6 (+3) | 0.8 (+3) | 121.8 (+3) | 12.1 (+3) | 133.9 (+3) | 133.4 (+3) | 0.5 (+3) | 121.2 (+3) | 1.39 (+3) |
| UF₆ | 1,289.9 (+3) | 1.29 (+3) | 1,288.6 (+3) | 52 | 1,288.6 (+3) | 239.3 | 1.29 (+3) | 1,287.3 (+3) | 1,288.6 (+3) |
| NpF₆ | 239.7 | 0.5 | 239.2 | 0.1 | 239.3 | 0.2 | 239.1 | 0.2 | 239.6 |
| NbF₅ | 34.6 | 34.6 | .028 | 2.8 (−5) | .028 | 2.8 (−5) | .028 | 3.9 (−8) | 34.6 |
| MoF₆ | 8,103 | 0 | 8,103 | 0 | 8,103 | 8 | 8,095 | 8 | 8,095 |
| TcF₆ | 1,989 | 0 | 1,989 | 0 | 1,989 | 2 | 1,987 | 2 | 1,987 |
| RuF₅ | 2 | 0 | .025 | 2.5 (−5) | .025 | 2.5 (−5) | .025 | 2.6 (−8) | 2.02 |
| SbF₅ | 247 | 187 | 60 | .053 | 60 | .0603 | 60 | .0073 | 247 |
| TeF₆ | 1,524 | 0 | 1,524 | | 1,524 | 2 | 1,522 | 2 | 1,522 |
| IF₅ | 880 | 235 | 645 | 0.35 | 645 | .64 | 645 | 0.29 | 880 |
| Kr | | | | | | | | | |
| Xe | | | | | | | | | |

| Stream | 31 | 31W | 32 | 32W | 33 | 33W | 34 | 34W | 35 |
|---|---|---|---|---|---|---|---|---|---|
| Flow rates (s.c.f.m.) | | | | | | | | | |
| PuF₆ | 14 | 14 | 0 | 0 | 0 | 0 | 0 | 0 | 0 |
| UF₆ | 1,288.5 (+3) | 129 | 1,288.4 (+3) | 12.9 (+3) | 1,275.5 (+3) | 12.0 (+3) | 1,263.5 (+3) | 1.2 (+3) | 1,262.3 (+3) |
| NpF₆ | 239.6 | 0.02 | 239.6 | 2.4 | 237.2 | 2.4 | 234.8 | 211.3 | 23.5 |
| NbF₅ | 31.1 | 29.9 | 1.2 | 1.2 | 0 | 0 | 0 | 0 | 0 |
| MoF₆ | 8,094 | 0.8 | 8,093 | 81 | 8,012 | 7,935 | 77 | 69 | 8 |
| TcF₆ | 1,987 | 0.2 | 1,987 | 20 | 1,967 | 20 | 1,947 | 1,887 | 60 |
| RuF₅ | 1.8 | 0.4 | 1.4 | 1.4 | 0 | 0 | 0 | 0 | 0 |
| SbF₅ | 222 | 216.5 | 5.5 | 5.5 | 0 | 0 | 0 | 0 | 0 |
| TeF₆ | 1,522 | 0.15 | 1,522 | 0 | 1,522 | 1,522 | 0 | 0 | 0 |
| IF₅ | 880 | 0.08 | 880 | 880 | 0.29 | 0 | .29 | 0 | .29 |
| Kr | | | | | | | | | |
| Xe | | | | | | | | | | a Read 123 (+3) 123×10³.
b Stream 10≅stream 7 since activity from stream 30 is negligible.
c Read 8.0 (−13) as 8.0×10⁻¹³.

In brief, the process comprises mechanical decladding of stainless steel clad oxide fuel elements and pulverization of the fuel. Fuel powder is continuously fed with alumina to fluorinator A where, in a fluidized bed, selective fluorination produces a uranium-rich overhead stream containing about 99% of the uranium, up to about 4% of the plutonium and certain volatile fission product fluorides. The unconverted uranium, plutonium, and fission product elements with the overflow or cascading alumina are continuously transferred to reactor B where essentially all of the uranium and plutonium is converted to the volatile hexafluorides along with some additional formation of volatile fission product fluorides. The overhead streams from reactors A and B are passed through gas coolers and cold traps where the product actinides are condensed. The product in the cold traps is liquefied and transferred to a common feed pot; subsequently the feed pot contents are volatilized to a thermal decomposer. In the decomposer, volatile plutonium hexafluoride is converted to nonvolatile plutonium tetrafluoride and separated from the volatile uranium hexafluoride. After separation, the nonvolatile plutonium tetrafluoride is refluorinated in the fluorinator to plutonium hexafluoride, purified and fed to a converter to produce the process product. The uranium hexafluoride vapor leaving the thermal decomposer is passed through various sorbent traps and into a series of continuously operating distillation columns in which high and low boiling fission products are separated from the uranium hexafluoride. The bottoms from the last distillation column are passed through a second series of sorbent traps to further purify the uranium hexafluoride which is thereafter fed to the converter with the plutonium hexafluoride.

The process will now be described in more detail, particularly with reference to the drawings and Tables I and II.

Mechanical head-end

Fuel elements or pins arriving at the reprocessing plant are removed from the shipping cask and tested for sodium logging. Since product losses would occur by the introduction of sodium, those pins which are suspect must be set aside for further processing before they can be prepared for flourination. The sodium, in sodium-logged fuel pins, is converted to sodium oxide by exposure to a controlled air atmosphere during pin decladding. The oxide fuel is washed with water to remove the sodium oxide as sodium hydroxide which is sent to waste. The sodium-free pins as well as the treated sodium-logged pins must be declad, and the fuel contained therein pulverized.

tion of many fission products occurs because nonvolatile fission product components are formed which stay with the alumina bed material and are eventually discharged to waste. Table III shows the separation of the actinide and fission product elements in terms of volatility of their fluorine components.

TABLE III

| | Nonvolatile | | | | Volatile | | |
|---|---|---|---|---|---|---|---|
| Element | Grams a | Curies b | Watts c | Element | Grams a | Curies b | Watts c |
| Rb | 142 | ~0 | ~0 | U | 87.5(5) | | ~0 |
| Sr | 398 | d 6.75(5) } | 5.79(3) | Np | 164 | | ~0 |
| Y | 223 | 1.17(6) } | | Pu | 8.35(4) | | ~0 |
| Zr | 2.95(3) | 2.27(6) | 1.16(4) | H | 0.21 | 2.06(3) | ~0 |
| Rh | 1.01(3) | g ~0 | g ~0 | | | | |
| Pd | 2.77(3) | 0.4 | ~0 | Kr | 132 | 3.23(3) | 4 |
| Ag | 518 | 3.43(4) | 85 | Nb | 76 | 2.91(6) | 1.37(4) |
| Cd | 294 | 5.21(3) | 21 | Mo | 3.78(3) | 111 | ~0 |
| In | 16 | 6.5 | ~0 | Tc | 928 | 15 | 0 |
| Cs | 3.65(3) | 7.67(4) | 405 | Ru | 3.94(3) | e 4.45(6) | e 2.28(4) |
| Ba | 922 | 5.72(5) | 1.78(3) | Sn | 213 | 1.53(4) | 77 |
| La | 903 | 6.57(5) | 1.10(4) | Sb | 141 | 8.07(4) | 290 |
| Ce | 2.62(3) | 2.93(6) } | 1.35(4) | Te | 870 | (f) | (f) |
| Pr | 1.03(3) | 2.14(6) } | | I | 511 | 1.98(3) | 6 |
| Nd | 2.63(3) | 1.87(5) | 526 | Xe | 4.68(3) | 8.61(4) | 103 |
| Pm | 397 | 3.64(5) | 182 | | | | |
| Sm | 475 | 5.15(3) | ~0 | | | | |
| Eu | 69 | 6.07(3) | 43 | | | | |
| Total | 2.10(4) | 7.39(6) | 4.49(4) | Total | 9.74(5) | 7.55(6) | 3.70(4) | a Grams of element.
b Beta curies.
c Assuming 100% conversion of beta plus gamma photons to heat.
d Read 6.57(5) as 6.57×10⁵.
e Includes Rh-103 and Rh-106.
f Not calculated. negligible.
g Rh-103 and 106 included with Ru.

There are several methods which may be employed to declad the fuel pins. The pins may be scored longitudinally at two diametrically opposite points and then compressed by rollers to split the cladding into two flat strips and release most of the fuel inside. Thereafter the strips may be rolled into spirals or chopped and vibrated to remove any oxide adhering thereto.

The pins may also be fed to a chopper to cut them into pieces approximately one-half to one inch long. The chopping is carried out in a closed atmosphere because some fission product gases may be released which will be fed to the off-gas disposal system. The chopped pins are fed to a ball mill and then to a vibrating screen to separate the fuel from the cladding. After the cladding has been separated and the fuel pulverized, fuel is transported to a storage vessel while the cladding pieces are sent to waste disposal. If it is advantageous to oxidize the fuel prior to entry into the fluorination process, the ball mill operation may be carried out with an air or oxygen atmosphere. The oxide fuel powder which is −48 +100 mesh is mixed with alumina in a volume ratio of one part fuel to one-half part alumina and fed to a storage hopper with a capacity for an eight-hour load so that some inventory is always present. Mixing the fuel oxide with the alumina prior to storage reduces the volumetric heat load in the hopper. Mixed fuel oxide and alumina feeds from the storage hoppers to fluorinator A.

Fuel fluorination

The dimensions of fluorinator A are set out in Table I and the mixed fuel and alumina is fed into the fluorinator at the rate of 57 kg. per hour and fluidized with a 23 v./o. fluorine in oxygen mixture at a flow rate of 37 standard cubic feet per minute, hereinafter s.c.f.m. The fluorination at 350° C. is selective in that uranium oxide, present as a mixture of uranium dioxide and $U_3O_8$, is converted to volatile uranium hexafluoride, while plutonium dioxide is mainly converted to nonvolatile plutonium tetrafluoride. This selective fluorination provides a primary separation which produces a plutonium-rich stream and a uranium-rich stream. In fluorinators A and B a basic decontamina- The table shows that about 49% of the fission product activity exists as nonvolatile fission product components that remain with the alumina.

The bottoms from fluorinator A, the composition of which is set out as stream 11 in Table II, are fed to the top stage of fluorinator B which is a two-stage reactor. The top stage of fluorinator B is maintained at 500° C., while the bottom stage is maintained at 550° C. The solids flow from reactor A to reactor B is the same rate as that fed to reactor A so that the solid inventory in A is always maintained. Similarly, the feed to reactor B is the same rate as the flow out of reactor B so that the fuel inventory in B is constant. The solids in reactor B which contains about 96% of the plutonium charged to reactor A in the form of plutonium tetrafluoride are fluidized with a 90 v./o. fluorine-oxygen mixture. The two stages of fluorinator B are separated by, and the bottom is formed of, downwardly pointing truncated tetrahedrons which permit gas flow upward and solids flow downward. The countercurrent flow of solids and gas improves contact therebetween, and the truncated tetrahedrons simplify design by eliminating overflow pipes. The gas flow rate and the tetrahedrons are so designed to provide a residence time for the solids of 9 hours in the top stage and 9 hours in the bottom stage. Solids, which flow from the bottom stage to waste as stream 20W, contain less than 1% of the charged plutonium, less than 1% of the charged uranium and the nonvolatile fission product fluorides. The treatment of this and other solid waste streams will be later explained.

Purification

The overhead stream 3 from fluorinator A, as shown in the figures, feeds gas cooler 1 at a rate of 32.7 s.c.f.m. The composition of the overhead stream 3 is given in Table II and contains about 4% of the plutonium charged to the fluorinator as either hexafluoride or oxyfluorides, about 99% of the uranium, about one-half of the neptunium and most of the molybdenum, technetium, ruthenium, antimony and iodine. The cooler, as shown in Table I, is maintained at 15° C. and its principal purpose is to reduce the heat load to cold trap 1 and provide a first major separation of niobium and ruthenium pentafluorides. There are two gas coolers, one of which is always onstream, while the other is dumping to waste.

The gas coolers are maintained above the dew point of the actinide hexafluorides and below the dew point of niobium pentafluoride and ruthenium pentafluoride in order to effect a primary separation thereof. As shown in Table II, essentially all of the ruthenium pentafluoride present is separated in gas cooler 1. Trace amounts of other ruthenium compounds present as ruthenium hexafluoride or ruthenium oxytetrafluoride are separated later in the process. About 80% of the niobium pentafluoride present is separated in gas cooler 1, as shown in Table II, while other niobium pentafluoride separation is provided in gas cooler 2. The overhead from gas cooler 1 feeds to cold trap 1 which is maintained at −80° C.

The cold traps are operated in pairs, one of which is always on-stream, while the other feeds to the feed pot, as shown in the figures. The cold trap's principal purpose is to collect the volatile hexafluorides and to provide for the purge of non-condensable waste gases by means of a bleed stream 36 which has a continuous flow rate of 2.2 s.c.f.m. Bleed stream 36 contains all of the krypton and some xenon, tellurium hexafluoride, oxygen and fluorine, and minor amounts of other fission product fluorides. The process conditions favor formation of $XeF_4$ and, although some xenon is discharged through streams 36 and 33W most of the xenon is separated as bottoms in the first distillation column. After the off-stream cold trap has been heated to about 80° C. under 2 atmospheres pressure and the liquefied product therein fed to the feed pot, the trap is blown down with fluorine which is recycled as stream 10 to fluorinator A. As will be later explained, noncondensable gases from the plutonium fluorination cycle are also recycled to fluorinator A so that bleed stream 36 is the only outlet for the noncondensable waste gases. This completes the first purification of the uranium-rich stream.

Overhead 12 from fluorinator B contains about 95% of the plutonium charged to reactor A, some uranium, about one-half of the neptunium, and minor amounts of other fission products and feeds into gas cooler 2 maintained at −10° C. There are two gas coolers 2 and they are operated in a similar manner to gas cooler 1, one is always on-stream, while the other is being flushed to waste. The purpose of gas cooler 2, like that of gas cooler 1, is to reduce the heat load to cold trap 2 and to effect a separation of the majority of the niobium and ruthenium pentafluorides present in stream 12. As shown in Table II, more than 95% of the niobium pentafluoride and more than 99% of the ruthenium pentafluoride present are separated in gas cooler 2 and sent to solid waste disposal as stream 12W. The noncondensed gases from gas cooler 2 flow to cold trap 2.

There are two cold traps 2, one of which is on-stream and maintained at −80° C., while the off-stream trap is being flushed to the feed pot. As may be seen from the figures, noncondensable gases from cold trap 2 are recycled as stream 30 to stream 10 and eventually are eliminated from the system in bleed stream 36. When cold trap 2 is taken off-stream, it is heated to about 80° C. under two atmospheres pressure and the liquefied product is fed to the feed pot. The cold trap is then blown down with fluorine which is passed through lithium fluoride trap A maintained at 450° C. and recycled to plutonium fluorinator B. Additional plutonium is added to stream 20, as plutonium hexafluoride desorbs from the lithium fluoride trap A, according to the following reaction:

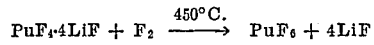

$$PuF_4 \cdot 4LiF + F_2 \xrightarrow{450°C.} PuF_6 + 4LiF$$

The presence of plutonium in the lithium fluoride trap will be explained later in the process.

Stream 5 from cold trap 1 and stream 14 from cold trap 2, as liquids, are fed to the feed pot maintained at 80° C. under 2 atmospheres pressure, which effects a one-stage batch distillation. There are two feed pots, one of which is on-stream, while the other is being blown down and then reloaded. The material in the feed pot on-stream, designated in Table II as stream 21, is evaporated from the pot as stream 23 and fed to the decomposer and fluorinator along with a recycle stream 24 from cold trap 3. The make-up of the feed to the thermal decomposer is set out in Table II as stream 25. After the feed pot is taken off-stream about 1% of the actinide hexafluorides remain with considerable amounts of the fluorides of niobium, antimony and iodine. This heel 22 is blown down with fluorine and combined with overhead stream 27 from the thermal decomposer as a feed to a lithium fluoride trap B maintained at 300° C. A comparison of streams 21 and 23 shows the decontamination effected by the single-stage distillation from the feed pot.

There are two thermal decomposer-fluorinators, one of which is on-stream with the feed pot and acting as a thermal decomposer for the separation of plutonium and uranium, while the other is on-stream with cold trap 3 acting as a plutonium fluorinator. The thermal decomposer consists of a fluidized bed of alumina maintained at 350° C. When stream 25 enters the thermal decomposer, the plutonium hexafluoride contained therein becomes unstable and decomposes to the nonvolatile tetrafluoride while the uranium hexafluoride remains stable and passes overhead. The overhead 27 from the thermal decomposer is fed to lithium fluoride trap B. When one thermal decomposer unit becomes loaded with plutonium tetrafluoride, stream 25 from the feed pot is switched from it to the other unit and the off-stream decomposer becomes a plutonium refluorinator. The fluorination in the off-stream thermal decomposer takes place at 500 to 550° C. with a fluidizing gas of ~100% fluorine. The plutonium hexafluoride produced in the refluorinator passes as stream 26 to cold trap 3 maintained at −80° C.

Cold trap 3 consists of three traps, one of which is always on-stream with the refluorinator, one of which is being warmed up to feed as stream 28 to the converter and one of which is being blown down and recycled as stream 24 to the thermal decomposer after it has fed to the converter. After the trap which has fed the converter is blown down, it is cooled in order to be ready to be put on-stream with the refluorinator. Any noncondensables in cold trap 3 are recycled to the refluorinator and pass with the overhead 27 from the thermal decomposer to the distillation columns. Stream 28 represents the final purification of the plutonium-rich stream in this process and is fed into the converter for the conversion to the oxide; however, only about 90% of the solid in cold trap 3 is vaporized to the converter. The other 10% is recycled to the thermal decomposer and provides decontamination factors of $2.5 \times 10^3$ for niobium pentafluoride and $1.7 \times 10^2$ for ruthenium pentafluoride.

Purification of the uranium-rich stream which is taken off as overhead 27 from the thermal decomposer and mixed with the blowndown heel 22 from the feed pot starts with lithium fluoride trap B. As may be seen in Table II, stream 27 contains almost all of the uranium hexafluoride charged to the thermal decomposer and very little plutonium hexafluoride. Almost all of the fluorides of neptunium, molybdenum, technetium, tellurium and iodine pass with overhead 27. Lithium fluoride trap B, maintained at 300° C., sorbs any of the remaining unconverted plutonium hexafluoride from overhead 27 of the thermal decomposer as $PuF_4 \cdot 4LiF$.

Lithium fluoride trap B is operated in conjunction with lithium fluoride trap A. When trap B is taken off-stream from the thermal decomposer, it is heated to 450° C. and switched on-stream to fluorinator B. After lithium fluoride trap A is taken off-stream from fluorinator B, it is cooled to 300° C. and put on-stream with the thermal decomposer. The lithium fluoride traps are continuously cycling, loading plutonium from the thermal decomposer and regenerating it to fluorinator B. The equipment specifications for the lithium fluoride traps are given in Table I. Table IV sets out operating specifications for the two traps.

TABLE IV

Loading cycle:
  Size—10 inch dia. x 3.5 feet
  LiF—Low surface area ~2 m.²/g., 45 kg.
  Operating temp.—300° C.
  PuF$_6$ load—2.8 kg.
  Loading time—2 days
  Gas flow rate—2 s.c.f.m.
  Gas residence time—4 sec.
Regeneration cycle:
  Operating temp.—450° C.
  F$_2$ rate—~30 s.c.f.m.
  Regeneration time—~1.6 days Ruthenium is built up on the lithium fluoride because some ruthenium is present in stream 29 and it does not desorb at 450° C. with a fluorine purge. Periodic replacement of the lithium fluoride trap material is necessary. Stream 31, which is now free of most of the plutonium hexafluoride, feeds from lithium fluoride trap B to sodium fluoride trap 1.

Sodium fluoride trap 1 is a fluidized bed of sodium fluoride particles about −48 +100 mesh, maintained at 350° C. Since there are large amounts of fluorine present, this sodium fluoride trap does not sorb neptunium hexafluoride but does trap some of the ruthenium pentafluoride, most of the niobium and antimony pentafluorides and virtually all of the residual plutonium hexafluoride. This reduces the fission product activity and heat load in distillation column 1. There are two sodium fluoride traps, one always on-stream and one off-stream; the contaminated off-stream trap is dumped to solid waste disposal. Overhead 32 from the on-stream sodium fluoride trap is fed to distillation column 1.

The principal purpose of distillation column 1 is to remove the high boilers, such as iodine pentafluoride and xenon tetrafluoride, from the process stream. As may be seen from stream 32W, essentially all the remaining niobium, ruthenium, antimony and iodine fluorides are removed and rejected to solid waste. The overhead 33 from distillation column 1, which is a 16-stage column, operated at 75° C. and 2 atmospheres pressure, passes to a distillation column 2, which is a 23-stage column, operated at 80° C. and 2 atmospheres pressure. Uranium hexafluoride, technetium hexafluoride, molybdenum hexafluoride and tellurium hexafluoride constitute most of the light fraction in the first distillation column, but only uranium hexafluoride and technetium hexafluoride become the heavy fraction in the second distillation column. Most of the molybdenum hexafluoride and essentially all of the tellurium hexafluoride come off the second distillation column as overhead 33W and are rejected to solid waste. The bottoms 34 from distillation column 2 are fed as a saturated vapor to a magnesium fluoride trap maintained at 125° C.

The magnesium fluoride trap sorbs most of the technetium hexafluoride present in the steam, as well as most of the remaining molybdenum hexafluoride. There are two magnesium fluoride traps and they are operated in a similar manner to the gas coolers previously described. The off-stream magnesium fluoride trap is dumped as stream 34W to solid waste, while the process stream from the on-stream trap is fed to a combination sodium fluoride 2-UO$_2$F$_2$-sodium fluoride 3 trap. The magnesium fluoride may be reused if desired by washing the off-stream trap with water to purify the magnesium fluoride and thereafter drying prior to use.

The combination trap maintained at 350° C. sorbs most of the neptunium hexafluoride present on the sodium fluoride while the fluorine present is reacted with the UO$_2$F$_2$ to form uranium hexafluoride. The sorption of neptunium hexafluoride on sodium fluoride produces fluorine gas according to the following reaction:

$$NpF_6 + NaF \rightarrow NpF_5 \cdot NaF + 1/2 F_2$$

The UO$_2$F$_2$ trap removes the fluorine gas and permits further sorption of neptunium hexafluoride by sodium fluoride trap 3. There are two combination traps and they are operated in the same manner as the gas coolers. Purification of the uranium-rich process stream 35 is complete and part of it is mixed with the plutonium-rich stream 28 and fed to the converter for conversion to the mixed oxide. The composition of the mixed hexafluoride stream is set out in Table V.

TABLE V

| Compound: | Grams compound | Beta curies |
|---|---|---|
| UF$_6$ | 406.4 (+3) | |
| NpF$_6$ | 7.7 | |
| PuF$_6$ | 121.2 (+3) | |
| 3 HF | .0042 | 5.31 |
| NbF$_5$ | 3.9 (−8) | 7.5 (−4) |
| MoF$_6$ | 10.6 | 0.145 |
| TcF$_6$ | 21.3 | 0.139 |
| RuF$_5$ | 2.6 (−8) | 4.6 (−5) |
| SbF$_5$ | .0073 | 2.40 |
| TeF$_6$ | 2 | Negligible |
| IF$_5$ | 0.38 | 0.85 |
| Totals | 527.64 (+3) | 8.85 |

The converter, maintained at 650° C. is a bed of mixed plutonium-uranium oxides fluidized with a mixture of steam and hydrogen. Streams 28 and 35 feed the converter and are adjusted to give a 23% PuO$_2$-UO$_2$ product. Excess uranium hexafluoride from stream 35 is cold trapped and retained for further use, and excess hydrogen may be recycled to the waste gas disposal system, hereinafter explained. The converter operates in alternating periods, one hour with the hexafluoride feed on and one hour with the hexafluoride feed off. The oxide product remains in the reactor and the off-gas of hydrogen fluoride is fed to a limestone trap.

Minor fission product species

While the process has been described with the various fission products present as hexa- or pentafluorides, some oxyfluorides or other species may exist. As previously stated, besides ruthenium pentafluoride, some ruthenium oxytetrafluoride and ruthenium hexafluoride may be present. Table VI shows the vapor pressures of these compounds compared to uranium hexafluoride.

TABLE VI

| | Vapor pressure in mm. Hg.— | | | Relative volatility of UF$_6$ at +80° C. |
|---|---|---|---|---|
| | −78° C. | 0° C. | +80° C. | |
| Compound: | | | | |
| RuF$_5$ | 5×0$^{-13}$ | 1.3×10$^{-4}$ | 0.21 | 8.920 |
| RuOF$_4$ | 4.5×10$^{-5}$ | 0.063 | 13.8 | 133 |
| RuF$_6$ | *(0.082) | 23 | *(1.000) | 1.84 |
| UF$_6$ | 7×10$^{-4}$ | 17.52 | 1.840 | 1.00 |

*Estimated.

While most of the ruthenium pentafluoride condenses in gas cooler 1, little or no ruthenium oxytetrafluoride or ruthenium hexafluoride will condense in the gas cooler. These ruthenium compounds are transferred to the feed pot where the majority remain during the one-stage distillation to the thermal decomposer. Trace amounts of the ruthenium hexafluoride and oxytetrafluoride pass to the thermal decomposer where ruthenium hexafluoride, which is unstable at 200° C., decomposes to the pentafluoride. Because of the large difference in volatilities at 80° C., see Table VI, the pentafluoride and oxytetrafluoride are easily separated from the uranium-rich stream in distillation column 1 and pass with stream 32W to waste. Decontamination of the above-mentioned ruthenium compounds from the plutonium-rich stream takes place during the one-stage distillation from the feed pot, as shown in Table VII, and across the thermal decomposer. The bottoms or heel 22 from the feed pot is mixed with the uranium-rich stream 27.

TABLE VII

| Compound: | Percent volatilized | Decontamination factor |
|---|---|---|
| $UF_6$ | 99.9 | |
| $NpF_6$ | 99.8 | |
| $PuF_6$ | 99.3 | |
| $RuF_5$ | 0.08 | $1.25 \times 10^3$ |
| $RuOF_4$ | 5.06 | 19.7 |
| $RuF_6$ | 97.7 | 1.02 |

As shown in Table VII and stated above, useful separations of ruthenium from plutonium occur in the feed pot except for ruthenium hexafluoride which decomposes to the pentafluoride in the thermal decomposer. Most of the ruthenium pentafluoride which passes with the plutonium hexafluoride from the plutonium fluorinator to cold trap 3 remains in the cold trap when the plutonium hexafluoride is distilled to the converter. Table VIII shows the decontamination factors for ruthenium in the process where the ruthenium is present as 90% $RuF_5$, 5% $RuOF_4$ and 5% $RuF_6$.

TABLE VIII

| CPS | FP[b]-1 | FP-2 | Feed pot | TD-1 | Still 1 | CT-3 |
|---|---|---|---|---|---|---|
| $RuF_5$ | $3.3 \times 10^3$ | $2.5 \times 10^4$ | $1.25 \times 10^3$ | $1 \times 10^3$ | $1 \times 10^6$ | $2.5 \times 10^3$ |
| $RuOF_4$ | 1 | 1 | 20 | $1 \times 10^3$ | $1 \times 10^6$ | 40 |
| $RuF_6$ | 1 | 1 | 1 | (a) | | |

[a] Decomposed to $RuF_5$. [b] FP = gas cooler.

In addition to molybdenum hexafluoride, some molybdenum oxytetrafluoride may be present. Table IX shows the pertinent vapor pressures at various temperatures.

TABLE IX

| Compound: | −80° C. | −10° C. | +15° C. | +75° C. |
|---|---|---|---|---|
| $MoF_6$ | 0.1 | 96.2 | 358.1 | 2.870 |
| $MoOF_4$ | $<10^{-5}$ | 0.02 | 0.20 | 10.3 |
| $UF_6$ | $5 \times 10^{-4}$ | 7.44 | 55.6 | 1.592 |

As seen from the table, the bulk of the oxytetrafluoride will condense in gas coolers 1 and 2. About half of the oxytetrafluoride present in the feed pot distills to the thermal decomposer and the other half passes with the feed pot heel 22 to be mixed with the uranium-rich stream 27. The molybdenum in the plutonium-rich stream is separated to a great extent in the one-stage distillation from cold trap 3, and as seen by the relative volatilities, the molybdenum in the uranium-rich stream remains as bottoms 32W in distillation column 1.

Besides technitium hexafluoride some technetium oxytetrafluoride and some technetium trioxyfluoride may be present. Table X shows some of their respective vapor pressures.

TABLE X

| | Vapor pressure (mm. Hg) | | | |
|---|---|---|---|---|
| Compound: | −80° C. | −10° C. | 15° C. | 75° C. |
| $TcF_6$ | $1 \times 10^{-2}$ | 29.7 | 135.2 | 1.412 |
| $TcOF_4$* | $<10^{-5}$ | $<2 \times 10^{-2}$ | <0.2 | <10 |
| $TcO_3F$ | $<10^{-4}$ | 1.4 | 16 | 305 |
| $UF_6$ | $5 \times 10^{-4}$ | 7.44 | 55.6 | 1.592 |

*Based on $MoOF_4$.

As seen from Table X and the above discussions for ruthenium and molybdenum, the oxytetrafluoride will condense in the gas coolers while the trioxyfluoride and the hexafluoride transfer to the feed pot. The relative volatilities show that the hexafluoride will follow uranium hexafluoride from the thermal decomposer and most of the oxytetrafluoride or trioxyfluoride will not distill from cold trap 3 with the plutonium hexafluoride. Any oxytetrafluoride or trioxyfluoride following the uranium-rich stream will remain as bottoms 32W in distillation column 1. The removal of technicium hexafluoride by the magnesium fluoride trap has been previously covered.

While some iodine oxypentafluoride and iodine heptafluoride may be present in the process stream, their volatilities at −80° C. are so large that a major separation will occur in cold traps 1 and 2, so these species will appear, if at all, in bleed stream 36.

Solid waste treatment

The solid wastes from the process are alumina, discharged from the plutonium fluorinator, sodium fluoride from the sodium fluoride 1, 2, and 3 traps as well as from the waste gas treatment, hereinafter explained, magnesium fluoride and lithium fluoride when it becomes unsuitable for use. These solid wastes generate large quantities of heat, thereby making their cooling and storage a problem. By mixing about 40% aluminum shot or powder with the solid waste, two-foot diameter storage cylinders may be used without exceeding 750° C. centerline temperatures. The aluminum melts due to the heat of the wastes and forms a superior heat transfer medium in the storage containers.

The sodium fluoride waste to be treated includes material from a fluid bed or sodium fluoride used with gas coolers 1 and 2. The ruthenium and niobium pentafluorides from off-stream coolers 1 and 2 are blown out of the coolers with oxygen to a fluidized bed of sodium fluoride. When this trap is loaded, the trap material is dumped and added to the solid wastes described above, while the overhead oxygen is added to the process waste gases for disposal.

Gas waste treatment

The gas wastes in the process consist of bleed stream 36, the bottoms from distillation column 1, the overhead from distillation column 2 and oxygen from the gas cooler clean-up described above. The overhead 33W from distillation column 2 is passed through a sodium fluoride trap, maintained at 100° C., to remove molybdenum hexafluoride and trace amounts of technetium hexafluoride, uranium hexafluoride and tritium fluoride. The overhead then passes through a packed bed of activated alumina, at 25 to 100° C., to remove tellurium hexafluoride and trace amounts of fluorine and technetium hexafluoride. Activated alumina is $Al_2O_3$ with a high surface area. The overhead 33W goes from the packed bed of activated alumina to a fluidized bed of activated alumina maintained at 500° C. Into this fluidized bed are also fed the bottoms 32W from distillation column 1, the off-gas 36 from the fluorinators A and B and the oxygen used to flush gas coolers 1 and 2. The fluorine is removed here and the gas continues on to a soda lime trap to remove iodine. In the soda lime trap, some tritium fluoride may be converted to tritium water. A molecular sieve dryer removes any tritium water present, and an oxygen burner converts the oxygen present to water by combustion with hydrogen. The remaining gases are xenon and krypton which are compressed and stored for about thirty days prior to release to the stack.

The above description is of the preferred embodiment but, clearly, modifications may be made within the scope of the invention. For instance, fluorinator A may be operated at a temperature sufficient to produce both uranium and plutanium hexafluoride; then, the overhead containing both actinide hexafluorides is passed through a gas cooler-cold trap series prior to introduction to the feed pot. There are numerous variations in conditions which may be applied to this process; however, the limitations of the process are only contained in the appended claims.

What we claim is:

1. A process for continuously processing spent nuclear fuel comprising: fluorinating oxides of the spent fuel in a fluidized bed with a mixture of oxygen and fluorine at about 350° C. to produce a gas rich in uranium hexafluoride, fluorinating the remaining spent fuel in a fluidized bed, maintained at between about 500 to 550° C., with a mixture of fluorine and oxygen containing a high proportion of fluorine to produce a gas rich in plutonium hexafluoride, separately removing most of the ruthenium pentafluoride and niobium pentafluoride from said gases by cooling the gases to between +15° C. and −10° C. and separating condensed fission products therefrom, combining said gases as a condensed gas and batch distilling the condensed gas to a thermal decomposer maintained at about 350° C., where a uranium rich stream passes overhead which carries most of the fission products present in the thermal decomposer and plutonium tetrafluoride remain in the thermal decomposer, fluorinating the plutonium tetrafluoride in the thermal decomposer by passing fluorine gas upwardly therethrough at a temperature of about 500° C. to form a plutonium rich stream, decontaminating the uranium rich stream by passing it consecutively through a lithium fluoride trap, a sodium fluoride trap, distillation columns to remove high low boiling fission product fluorides, a magnesium fluoride trap to remove technetium hexafluoride and a combination sodium fluoride-$UO_2F_2$-sodium fluoride trap whereby fluorine gas and neptunium hexafluoride are removed, removing residual niobium pentafluoride and ruthenium pentafluoride from the plutonium rich stream by condensing it at about −80° C. and converting the decontaminated uranium hexafluoride and plutonium hexafluoride to uranium dioxide and plutonium dioxide for reuse as nuclear fuel by passing both of these streams to a bed fluidized with steam and hydrogen to produce mixed plutonium dioxide and uranium dioxide.

2. The process of claim 1 wherein said gases rich in uranium hexafluoride and plutonium hexafluoride first obtained are also condensed at about −80° C. and the non-condensed gases are separated therefrom.

References Cited

UNITED STATES PATENTS

| | | | |
|---|---|---|---|
| 3,294,493 | 12/1966 | Jonke et al. | 423—19 |
| 2,875,021 | 2/1959 | Brown et al. | 423—19 |
| 3,098,709 | 7/1963 | Mecham et al. | 423—19 |
| 3,165,376 | 1/1965 | Golliher | 423—6 |
| 3,178,258 | 4/1965 | Cathers et al. | 423—6 |
| 3,264,070 | 8/1966 | Ramaswani et al. | 423—19 |
| 3,429,669 | 2/1969 | Camozzo et al. | 423—4 |

OTHER REFERENCES

ANL-7372 Laboratory Investigations in Support of Fluid-Bed Fluoride Volatility Process, Anastasia et al., pp. 11–13 and 23–25.

ORNL-TM-1849 Fluoride Volatility Processing Semi-annual Report for Period Ending Nov. 30, 1966, Littlefield et al., July 1967, pp. 70–73.

Reactor Fuel Process, July 1958, vol. I, No. 3, p. 3.

CARL D. QUARFORTH, Primary Examiner

F. M. GITTES, Assistant Examiner

U.S. Cl. X.R.

423—4, 6, 11, 19, 251, 258